INVENTORS
Theodore A. St Clair
Louis A. Godkin
BY
Johnson and Kline
ATTORNEYS

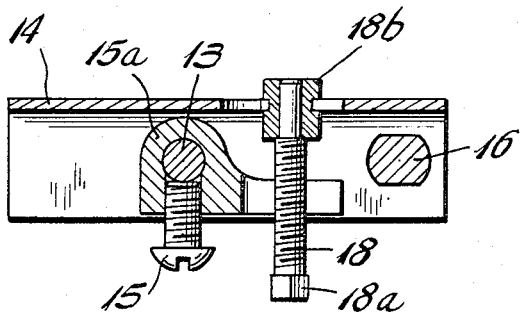
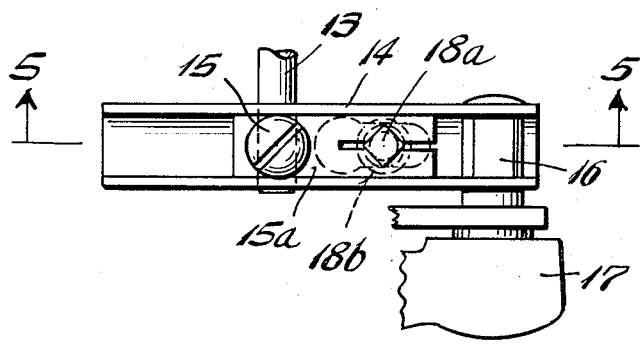

United States Patent Office 3,411,358
Patented Nov. 19, 1968

3,411,358
ADJUSTMENT FLANGE ASSEMBLY FOR
GAS METERS
Theodore A. St. Clair, Fairfield, and Louis A. Godkin, Bethel, Conn., assignors to Textron, Inc., Providence, R.I., a corporation of Rhode Island
Filed Mar. 21, 1967, Ser. No. 624,747
5 Claims. (Cl. 73—281)

ABSTRACT OF THE DISCLOSURE

The three chamber gas meter is provided with a novel tangent adjustment flange assembly having a movable pivot so arranged as to permit displacement adjustment of the diaphragm without substantial interference with or alteration of the timing of the meter. Also the timing adjusting screw and the displacement adjusting feed screw are so arranged in close proximity that they can readily be located by an adjusting tool inserted through an opening in the meter casing for adjustment of the timing and displacement during the proving of the meter.

---

Heretofore in tangent adjustment flange assemblies for three chamber gas meters having a fixed and an adjustable pivot pin thereon for connection to the diaphragm link arms, the adjustable pivot has been adjustable along a line of action, forming one side of the timing angle for the meter and passing through the main shaft of the meter, when it was necessary to make a diaphragm displacement adjustment during proving of the meter. Also the screws for adjusting the timing and the displacement were laterally displaced and difficult to locate by tools extending through the proving aperture in the meter.

The present invention provides a three chamber meter with a novel displacement adjusting means which does not substantially alter the timing of the meter and has the timing and displacement adjustment means so positioned that they can be readily located by tools extending through the usual prover opening in the meter casing during the proving of the meter.

This is accomplished by changing the movement of the movable pivot so that it has a line of action which intersects one side of the timing angle passing through the fixed pivot and the axis of the main shaft of the meter at a point between said fixed pivot and axis and intersects with the other side of the timing angle passing through the main shaft axis and having an angular displacement from the first side by said number of degrees of said timing angle at a predetermined angle and by moving the timing adjustment on the timing arm to a position adjacent the displacement adjustment means so that they are both readily available during proving of the meter.

Other features and advantages of the invention will be apparent from the specification and claims when considered in connection with the accompanying drawings in which:

FIG. 4 is a detail side view of the adjusting arm.

FIG. 5 is a sectional view taken along line 5—5 of FIG. 4.

Figure 1:
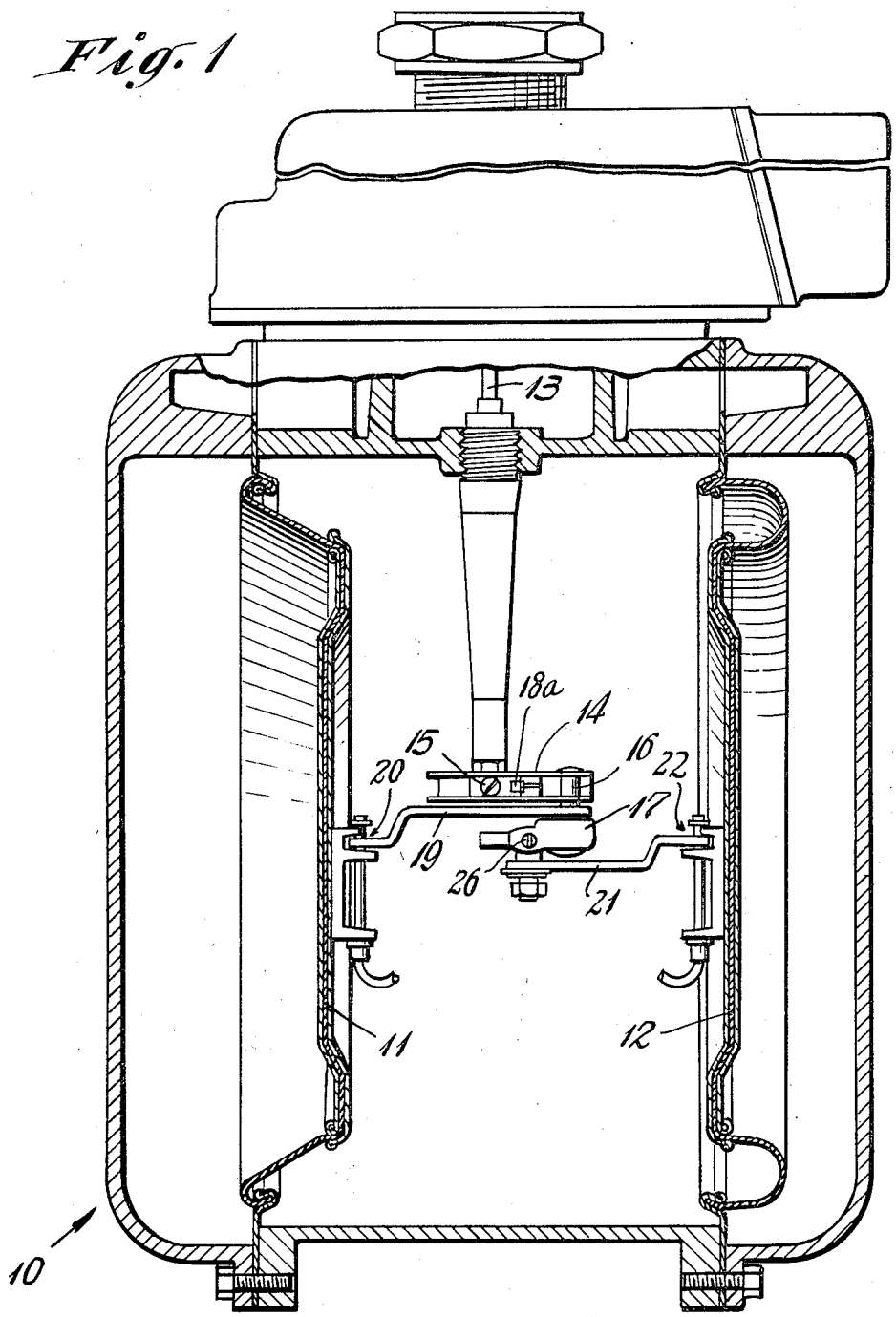
FIG. 1 is a three chamber gas meter, partly in section, showing the invention.

As shown in the drawings the gas meter has a casing 10 divided by the usual diaphragms 11, 12 into three measuring chambers. The meter has a rotatably mounted main shaft 13 for driving the usual valve (not shown), said shaft extending into the center chamber, as shown in FIG. 1, and has a timing arm 14 secured to the inner end of the main shaft 13 by screw 15 to rotate therewith. One end of the arm is fixedly connected to a pivot pin 16 fixed to the body 17 of the tangent adjustment flange assembly. The arm 14 is an articulated arm and has an adjusting screw 18 whereby the location of the pivot pin 16 with respect to the axis of the main shaft can be adjusted for varying the timing of the meter.

As shown in FIGS. 4 and 5, the arm 14 is channel shaped and encloses the bracket 15a which is secured to the main shaft 13 by the screw 15. The bracket 15a has the adjusting screw 18 threaded therein and the end of said screw is carried by the bushing 18b secured to the arm 14 so that rotation of the screw 18 will cause the angular relation between the arm 14 and bracket 15a to be varied causing displacement of the pivot pin 16.

Figure 2:
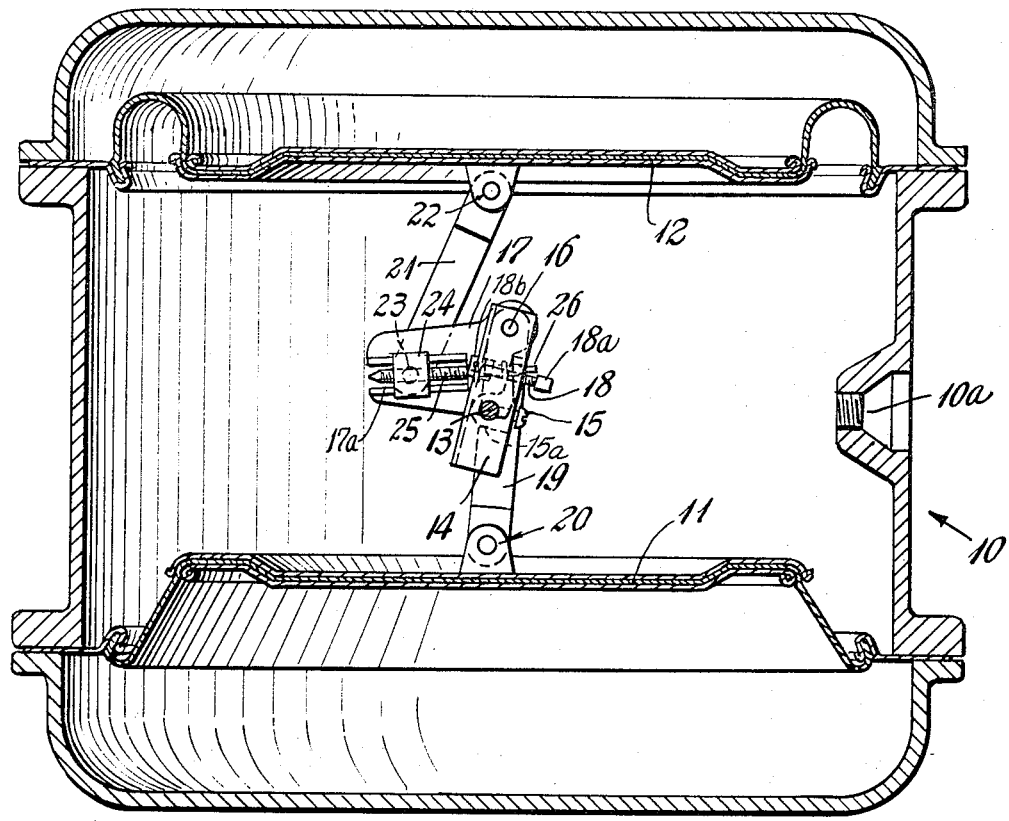
FIG. 2 is a horizontal sectional view through the meter showing the invention.

As shown in FIG. 2 the body 17 is connected to the diaphragm 11 by a link 19 by having one end of the link pivotally mounted on the fixed pivot pin 16 and the other end pivotally connected at 20 to the center of the diaphragm 11.

The body 17 is connected to the other diaphragm 12 by a link 21 having one end pivotally connected to the diaphragm at 22 and the other end pivotally mounted on a pivot pin 23 mounted on a nut 24 (FIG. 2) slidable in a slot 17a on the body in a definite line of action C and cooperating with a feed screw 25 having a projecting tool-receiving head 26 so that by adjusting the feed screw, the pin will move relative to the body along said line of action and operate through the links to produce the relative displacement of the diaphragms as required during the proving of the meter.

Figure 3:
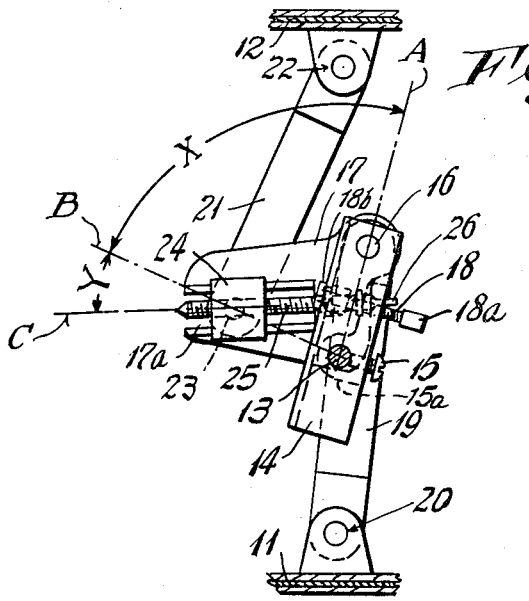
FIG. 3 is an enlarged view of the timing arm and tangent adjustment flange assembly.

In order to provide for the displacement adjustment of the diaphragms without substantial interference with the timing of the meter, the present invention provides a relationship as shown in FIG. 3 wherein the fixed pivot pin 16 and axis of the shaft 13 lie on line A which forms one side of the timing angle X. Line B, which passes through the axis of the main shaft 13, is angularly displaced by the angle X and forms the other side of the timing angle. It has been found that if the line of action C of the movable pivot 23, rather than coincide with line B as heretofore arranged, intersects line A at a point between the fixed pivot 16 and the axis of the shaft 13 and intersects line B at a predetermined angle Y, pure displacement adjustment can be made without substantially altering the timing of the meter.

For example, with a basic timing angle X of 80° the angle Y can be 27.2°. This, however, can vary slightly depending upon the specific construction of the meter and the material of the diaphragms.

As shown in FIG. 2 the timing adjustment screw 18 has been moved to a position between the pivot pin 16 and axis of the shaft 13 so that its head 18a is disposed adjacent the head 26 of the feed screw and in substantial alignment with the proving aperture 10a in said casing so that when the usual plug is removed from the aperture 10a the adjusting screws can be readily located and manipulated to effect the required timing and displacement adjustment.

Variations and modifications may be made within the scope of the claims and portions of the improvements may be used without others.

We claim:
1. In a three chamber gas meter having a main shaft, a tangent adjustment flange assembly comprising a body connected to said main shaft to rotate about the axis thereof and having a fixed pivot pin thereon for connecting a diaphragm link thereto, said body having an adjustable pivot thereon for connecting another diaphragm link thereto, means for adjusting the adjustable pivot to move in a straight line of action to vary the relative displace- ment of said diaphragms, a line through said fixed pivot and axis forming one side of the timing angle for said meter and the other side being formed by a second line passing through said axis and angularly displaced from the first line by the number of degrees required for the timing angle, said means for adjusting the adjustable pivot being disposed on the body so that the line of movement thereof intersects the first line between the axis and first pivot and intersects the second line at a predetermined angle with respect thereto whereby the displacement of the diaphragms can be adjusted during proving of the meter without interfering with the timing of the meter.

2. The invention as defined in claim 1 wherein the gas meter has a casing provided with a proving aperture having a removable plug in the side wall and the adjusting means for the pivot includes a feed screw and wherein the connection of the body to the main shaft comprises a timing arm secured to the shaft and having an adjustment screw thereon for adjusting the timing of the meter, said adjustment screw being disposed adjacent the end of said feed screw and in substantial alignment with said aperture to facilitate locating thereof by a tool inserted through said aperture during adjustments for both timing and displacement during proving of the meter.

3. The invention as defined in claim 1 wherein the means for adjusting the adjustable pivot comprises a feed screw having means at one end thereof for rotating said screw.

4. The invention as defined in claim 1 wherein the timing angle is approximately 80° and the angle of the line of action with respect to said second line is approximately 27.2°.

5. A tangent adjustment flange assembly for a three chamber gas meter having a main shaft, comprising a body connected to said main shaft to rotate about the axis thereof and having a fixed pivot pin thereon for connecting a diaphragm link thereto, said body having an adjustable pivot thereon for connecting another diaphragm link thereto, means for adjusting the adjustable pivot to move in a straight line of action to vary the relative displacement of said diaphragms, a line through said fixed pivot and axis forming one side of the timing angle for said meter and the other side being formed by a second line passing through said axis and angularly displaced from the first line by the number of degrees required for the timing angle, said means for adjusting the adjustable pivot being disposed on the body so that the line of movement thereof intersects the first line between the axis and first pivot and intersects the second line at a predetermined angle with respect thereto whereby the displacement of the diaphragms can be adjusted during proving of the meter without interfering with the timing of the meter.

References Cited
UNITED STATES PATENTS

| | | | |
|---|---|---|---|
| 876,875 | 1/1908 | Henning | 73—278 |
| 2,296,476 | 9/1942 | McIntire | 73—281 |
| 2,296,477 | 9/1942 | McIntire | 73—281 |
| 2,296,485 | 9/1942 | Whitworth | 73—281 |
| 2,932,198 | 4/1960 | Whitworth | 73—281 |

FOREIGN PATENTS

| | | |
|---|---|---|
| 10,075 | 5/1895 | Great Britain. |
| 725,118 | 3/1955 | Great Britain. |
| 791,460 | 3/1958 | Great Britain. |
| 1,061,789 | 3/1967 | Great Britain. |

JAMES J. GILL, *Primary Examiner.*

ROBERT S. SALZMAN, *Assistant Examiner.*